United States Patent
Murakami et al.

(10) Patent No.: US 8,264,948 B2
(45) Date of Patent: Sep. 11, 2012

(54) INTERCONNECTION DEVICE

(75) Inventors: Hiroshi Murakami, Kawasaki (JP); Yoshihiro Kusano, Kawasaki (JP); Gou Sugizaki, Kawasaki (JP); Satoshi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/196,984

(22) Filed: Aug. 22, 2008

(65) Prior Publication Data
US 2008/0310297 A1 Dec. 18, 2008

Related U.S. Application Data

(63) Continuation of application No. PCT/JP2006/303451, filed on Feb. 24, 2006.

(51) Int. Cl.
*G01R 31/08* (2006.01)
(52) U.S. Cl. .......................................... 370/216; 714/49
(58) Field of Classification Search .......... 370/216–228, 370/242, 244–245, 392–394, 465, 474, 476, 370/529; 714/2, 5–8, 48–52, 746–747, 774
See application file for complete search history.

(56) References Cited

U.S. PATENT DOCUMENTS

| | | | | |
|---|---|---|---|---|
| 5,161,156 A | * | 11/1992 | Baum et al. ........................ 714/4 |
| 5,210,751 A | * | 5/1993 | Onoe et al. ..................... 370/349 |
| 5,555,261 A | * | 9/1996 | Nakayama et al. ........... 370/474 |
| 5,671,226 A | * | 9/1997 | Murakami et al. ............. 370/474 |
| 5,778,001 A | * | 7/1998 | Nakayama et al. ....... 370/395.62 |
| 5,822,257 A | * | 10/1998 | Ogawa ........................... 365/200 |
| 5,914,953 A | * | 6/1999 | Krause et al. ................. 370/392 |
| 6,262,594 B1 | | 7/2001 | Cheung et al. |
| 6,526,467 B1 | | 2/2003 | Joh |
| 6,530,055 B1 | * | 3/2003 | Fukunaga ...................... 714/746 |
| 6,957,273 B2 | | 10/2005 | Haneda et al. |
| 7,062,686 B2 | * | 6/2006 | Moritomo ........................ 714/52 |
| 7,106,742 B1 | * | 9/2006 | Frisch et al. ................... 370/394 |
| 7,315,542 B2 | * | 1/2008 | Gil et al. ........................ 370/392 |
| 7,624,324 B2 | * | 11/2009 | Hanaoka et al. .............. 714/746 |
| 7,706,349 B2 | * | 4/2010 | Geile et al. .................... 370/343 |
| 2001/0056562 A1 | | 12/2001 | Shieh |

(Continued)

FOREIGN PATENT DOCUMENTS

JP 9-231187 A 9/1997

(Continued)

OTHER PUBLICATIONS

Nagano Tomoaki, Communication Fault Processor and Communication Fault Processing Method, Jun. 22, 1999, Japanese Patent Application No. 11-168502, pp. 1-21.*

(Continued)

*Primary Examiner* — Chi H. Pham
*Assistant Examiner* — Kevin Mew
(74) *Attorney, Agent, or Firm* — Fujitsu Patent Center

(57) ABSTRACT

A plurality of system board modules are connected to a crossbar module. An error detection unit detects an error in a packet received from a corresponding system board module. When an error is detected by the error detection unit, a transmission control unit issues a completion data generation request. When receiving the completion data generation request, a packet completion unit generates completion data. When receiving an error packet, a selector circuit outputs a completion packet in which completion data is provided in place of a data unit involving error.

5 Claims, 4 Drawing Sheets

U.S. PATENT DOCUMENTS

| | | | |
|---|---|---|---|
| 2002/0075868 A1* | 6/2002 | Gupta et al. | 370/389 |
| 2004/0017778 A1 | 1/2004 | Bansal et al. | |
| 2004/0062244 A1 | 4/2004 | Gil et al. | |
| 2005/0074007 A1* | 4/2005 | Samuels et al. | 370/392 |
| 2006/0069977 A1* | 3/2006 | Maeda et al. | 714/752 |
| 2006/0077822 A1* | 4/2006 | Kim | 369/47.2 |
| 2007/0190998 A1* | 8/2007 | Tanaka et al. | 455/423 |
| 2007/0294609 A1* | 12/2007 | Inokuchi et al. | 714/769 |
| 2008/0068134 A1* | 3/2008 | Kimura | 340/10.1 |
| 2009/0210610 A1* | 8/2009 | Koguchi | 710/317 |
| 2010/0039942 A1* | 2/2010 | Nakatsuji et al. | 370/241 |

FOREIGN PATENT DOCUMENTS

| | | |
|---|---|---|
| JP | 11-168502 | 6/1999 |
| JP | 2001-7893 | 1/2001 |
| JP | 2001-320385 A | 11/2001 |
| JP | 2003-283539 | 10/2003 |
| JP | 2004-13723 | 1/2004 |
| JP | 2006-14153 | 1/2006 |
| JP | 2006-31199 A | 2/2006 |

OTHER PUBLICATIONS

Kohichiroh Ogita et al., "The Importance of the System Clinic along with the System Integration/Migration", *IPSJ SIG Technical Report*, vol. 2004, No. 106, Nov. 4, 2004, pp. 25-30.

International Search Report mailed on May 30, 2006 in connection with International Application No. PCT/JP2006/303451.

European Search Report mailed Aug. 5, 2009 and issued in corresponding European Patent Application 06714590.4.

Chinese Office Action dated Sep. 18, 2009, issued in corresponding Chinese Patent Application 2006800529803.

State Intellectual Property Office of China: "Chinese Office Action", issued Oct. 26, 2010 for corresponding Chinese Patent Application No. 200680052980.3, with English-language translation.

"Japanese Office Action" mailed by JPO and corresponding to Japanese application No. 2008-501543 on Feb. 22, 2011, with English translation.

"Japanese Office Action" mailed by JPO and corresponding to Japanese application No. 2008-501543 on May 24, 2011, with English translation.

Japanese Office Action mailed Jan. 10, 2012 for corresponding Japanese Application No. 2008-501543, with Partial English-language Translation.

* cited by examiner

| MODULE ID | PARTITION |
|---|---|
| #0 | A |
| #1 | A |
| #2 | B |
| ⋮ | B |
| #N | B |

F I G. 2

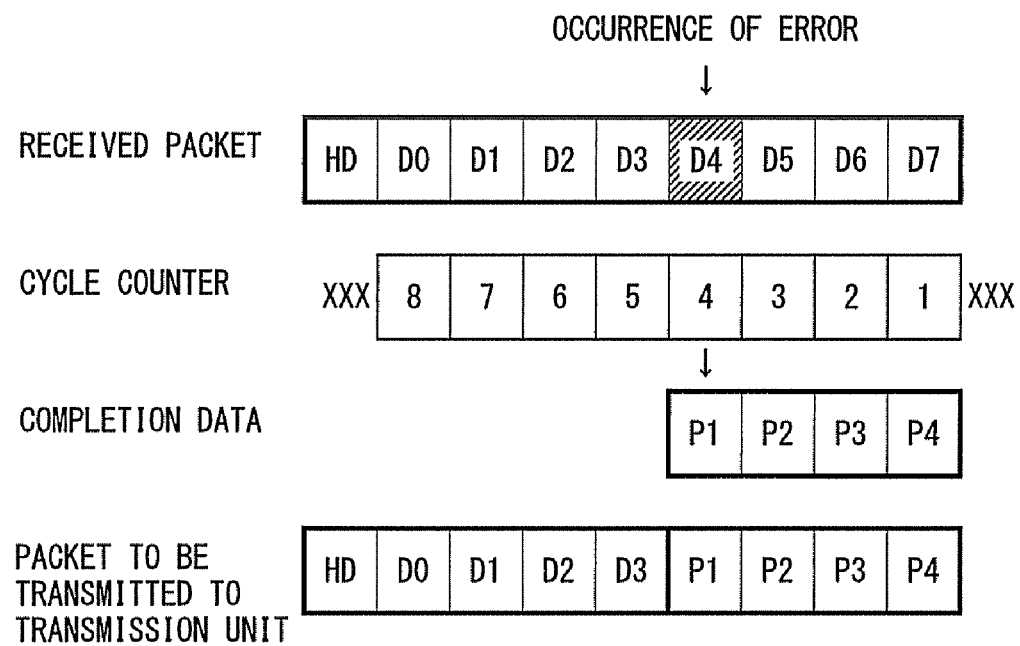
F I G. 3

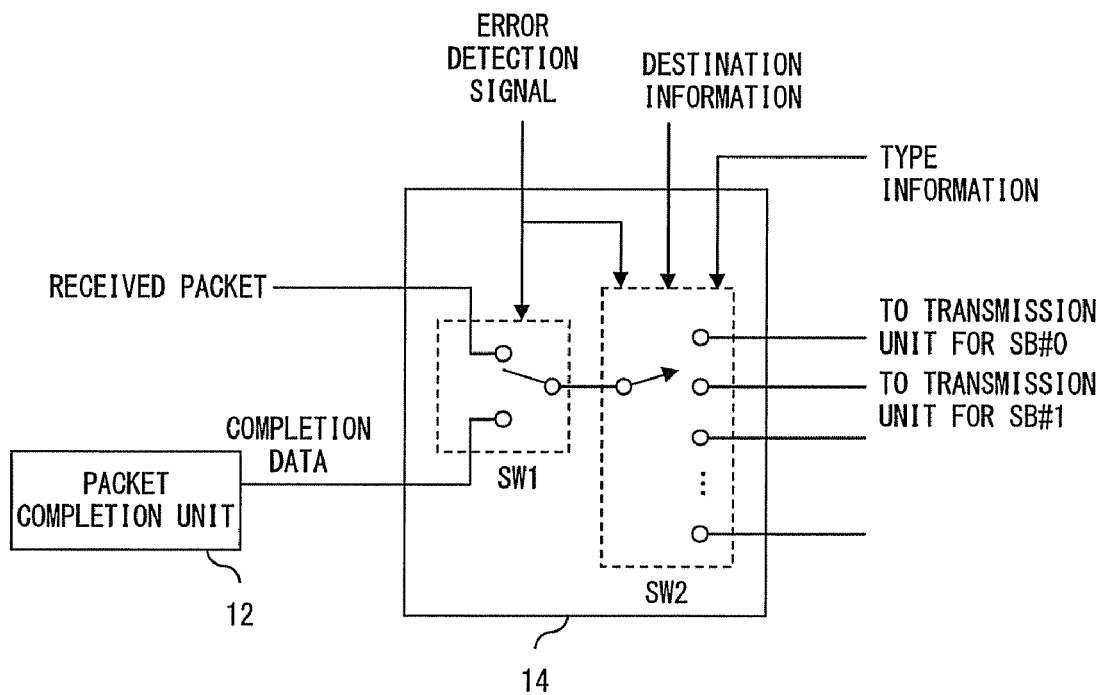
F I G. 4

US 8,264,948 B2

INTERCONNECTION DEVICE

CROSS REFERENCE TO THE RELATED APPLICATION

This is a continuation of a PCT application PCT/JP2006/303451, which was filed on Feb. 24, 2006.

BACKGROUND OF THE INVENTION

1. Field of the Invention

The present invention relates to an interconnection device for interconnecting a plurality of information processing modules, and may be applied to a error control apparatus for controlling errors detected in the interconnection device.

2. Description of the Related Art

A configuration in which a large scale saver system is realized by interconnecting a plurality of information processing modules is known as a conventional technique. In such a configuration, each of the information processing modules has a CPU and a memory device, and can perform information processing corresponding to given programs. Also, it is possible to expand the server system by increasing the number of the information processing modules to be interconnected.

A plurality of the information processing modules are interconnected by using a crossbar module serving as an interconnection device. The crossbar module relays/transmits information (packets containing information in this example) between the information processing modules.

In a server system of the above configuration, when a packet is sent out from an information processing module that has failed or when a bus connecting an information processing module and a crossbar module is disconnected, invalid or inadequate packets (referred to as error packets hereinafter) is input into the crossbar module. However, many of the conventional crossbar modules do not have a function of handling error packets. Accordingly, there is a probability that the influence of error packets extends to the circuit elements and/or other information processing modules in the crossbar module so that the subsequent operations can not be executed. In such a case, the entire server system (or many of the circuit elements in the server system) has to be once halted, and has to be again activated after examining and recovering the failed portion.

A configuration in which a crossbar module has a function of detecting error packets is also known. In this system, when an error packet is detected, the operation of the information processing module that has sent out the error packet is halted by means of software processing. However, in this configuration, the error packet itself is transferred without being discarded, and the influence of the error may extend to a wider area. Also, there is a probability that another error packet may be sent out before the operation of the information processing module that has sent out the first error packet is halted.

Many of the recent large scale server systems employ the partitioning function by which computer resources such as CPUs, memory devices, and the like are classified into a plurality of groups (hereinafter referred to as partitions) so that the server system operates as virtually independent plural computers. This partitioning function is realized by classifying, for example, a plurality of information processing modules into groups. However, in the conventional technique, there is a probability that the influence of error packets extend over partitions so that the entire server system (or many of the circuit elements in the server system) has to be halted. In such a case, the stable operation of the server system is inhibited for a long time period.

SUMMARY OF THE INVENTION

It is an object of the present invention to minimize the scope over which the influence of an error propagates in an information processing system having a plurality of information processing modules.

One aspect of an error control apparatus is provided in an interconnection device for interconnecting a plurality of information processing modules, and includes an error detection unit for detecting an error in an input packet; a completion data generation unit for generating completion data in accordance with a position at which an error is detected in the input packet; and an output unit for outputting a completion packet in which the completion data is provided in place of a data unit involving the detected error and a subsequent data unit.

Another aspect of an error control apparatus is provided in an interconnection device for interconnecting a plurality of information processing modules, and includes a holding unit for temporarily holding an input packet; an error detection unit for detecting an error in the input packet; and an output unit for reading a packet from the holding unit and outputting the read packet to a destination information processing module only when no error is detected in all area of the input packet.

BRIEF DESCRIPTION OF THE DRAWINGS

FIG. 2 shows an example of a partition table;

FIG. 3 shows completion operations; and

FIG. 4 shows an example of a selector circuit.

DESCRIPTION OF THE EMBODIMENTS

Figure 1:
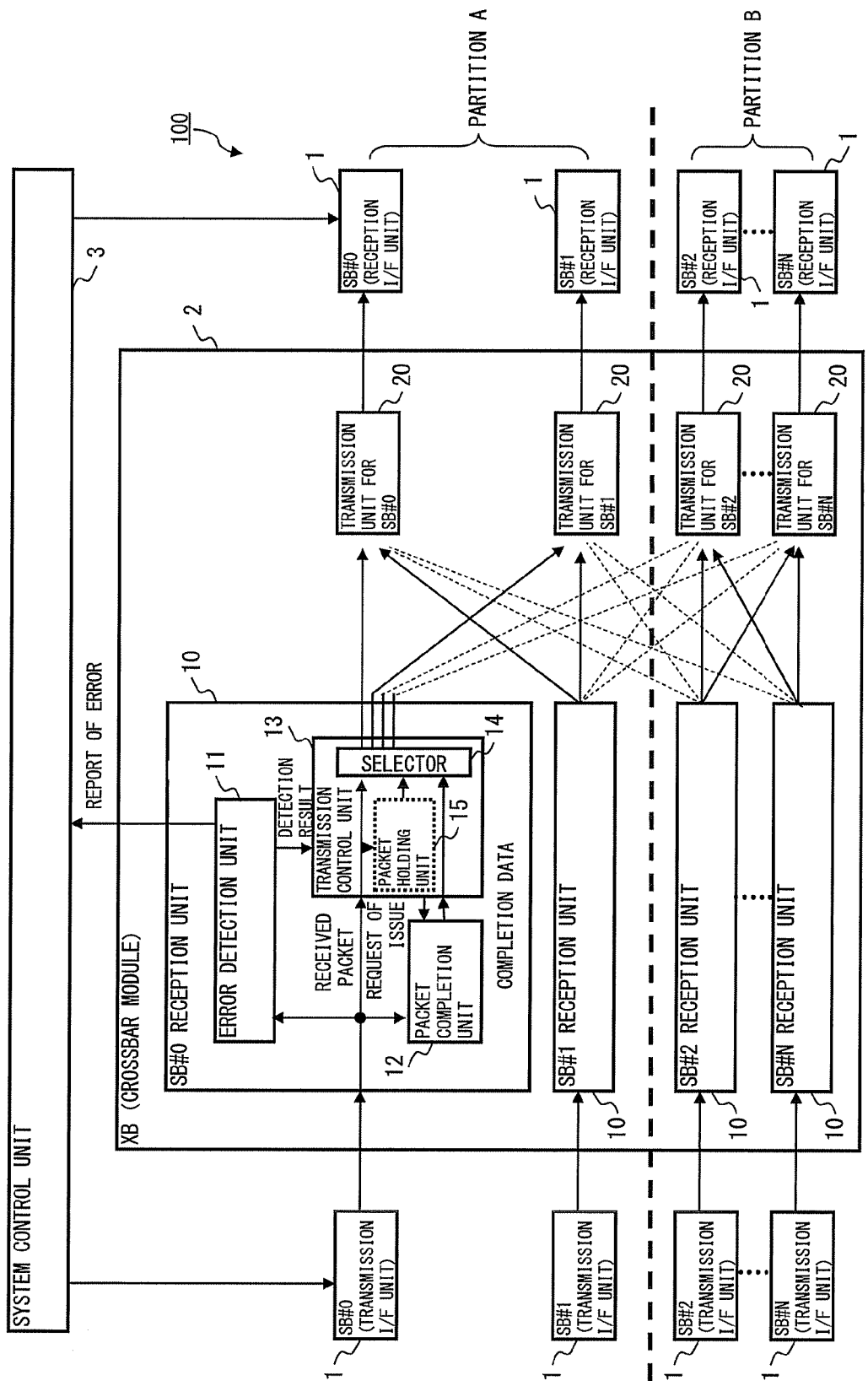
FIG. 1 shows a configuration of an information processing device having an error control apparatus according to an embodiment.

FIG. 1 shows a configuration of an information processing device having an error control apparatus according to an embodiment. In the explanations below, a server system 100 that executes information processing corresponding to requests received from a client (not shown) is used as an example of the information processing device.

The server system 100 includes a plurality of system board modules (SB) 1, a crossbar module (XB) 2, and a system control unit 3.

Each of the system board modules 1 is an information processing module that includes a CPU, a memory device, a transmission I/F unit, and a reception I/F unit. In this example, the server system 100 includes "N+1" system board modules (#0 through #N). Also, in FIG. 1, the CPUs and the memory devices are not shown in order to clarify the illustration, and only the transmission I/F unit and the reception I/F unit in each system board module 1 are shown. Each system board module 1 can transmit a packet to one or a plurality of desired destination system board modules.

A plurality of the system board modules 1 are connected to the crossbar module 2, and the crossbar module 2 provides a function of transferring packets between the system board modules 1. In order to provide this function, the crossbar module 2 has a plurality of reception units (#0 through #N) 10 and a plurality of transmission units (#0 through #N) 20. Each reception unit 10 is connected to a transmission I/F unit in a uniquely corresponding system board module 1. Also, each transmission unit 20 is connected to a reception I/F unit in a uniquely corresponding system board module 1. The reception unit 10 transfers a packet received from the transmission I/F unit in the system board modules 1 to one or a plurality of the transmission units 20. By this configuration, the packet transmission between the system board modules 1 is realized.

The system control units 3 controls the entire operations of the server system 100. Also, the system control unit 3 can perform the degeneracy control as one of the operations related to the error control according to the embodiment. Specifically, when an error detection unit 11 (that will be described later) detects an error packet, the system control unit 3 can transmit a degeneracy instruction to the system board module 1 that sent out the error packet. In such a case, the system board module 1 that has received the degeneracy instruction refrains from sending out a part or all of packets until it receives a degeneracy cancellation instruction.

Figure 2:
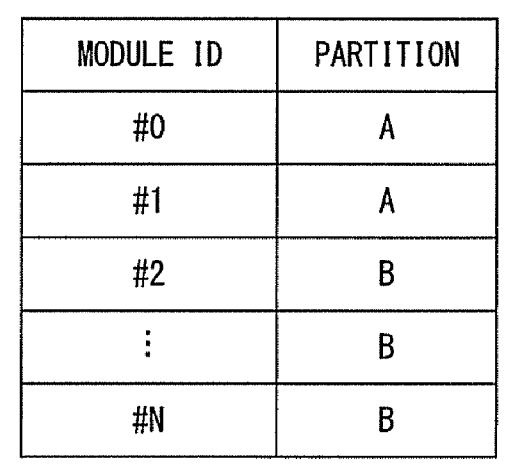

The server system 100 in the above configuration provides the partitioning function. In this example, the system board modules (#0 and #1) belong to partition A, and the system board modules (#2 through #N) belong to partition B. The partitions are defined in accordance with a partition table shown in FIG. 2. This partition table is managed by the system control unit 3, and is distributed to the respective reception units 10. In accordance with the distributed partition tables, the respective reception units 10 perform setting for hardware circuits (such as registers) for checking the destinations of packets. Then, the respective reception units 10 use the hardware circuits and prohibit the packet transfer over the different partitions. Additionally, the solid lines between the reception units 10 and the transmission units 20 are paths through which the packet transmission is permitted, and the dashed lines are the paths through which the packet transmission is prohibited by the partitioning function. Due to this function, the system board modules belonging to the respective partitions can operate as computers that are independent of one another.

Each packet transferred via the crossbar module 2 basically includes a header (HD) and data units (D0 through D7) as shown in FIG. 3. The number of the data units is not particularly limited. Also, it is possible to transfer a packet that does not include a data unit.

The header contains destination information, type information, cycle number information, and the like. The destination information specifies the system board module that is the destination of the packet. The type information specifies the packet type. Additionally, the packets transferred between the system board modules include a peer-to-peer packet, which is transferred to one system board module that is specified by the destination information and also includes a broadcast packet, which is transferred to all the system board modules in the partition. For the data transmission from the CPU to the memory device, the peer-to-peer packet is basically used. For the address snoop for checking the cache status of the CPUs, the broadcast packet is used. As the cycle number information, information used for calculating the cycle number required for transmitting the data units is contained. In this configuration, when the width of the bus used for transmitting packets is fixed, the cycle number information consists of the information representing the number of the data units. In the example of FIG. 3, "8" is set as the cycle number information. Also, an error correcting code (ECC) is added to the header.

The sizes of the data containing regions in the respective data units are basically the same. Also, an error correcting code is added to each data unit.

Next, error control operations according to the embodiment will be explained. Also, the data control is performed mainly in each reception unit 10.

Each of the reception units 10 includes an error detection unit 11, a packet completion unit 12, and a transmission control unit 13. The packet received from the corresponding system board module 1 is given to the error detection unit 11, the packet completion unit 12, and the transmission control unit 13 in parallel. The reception unit 10 is basically realized by hardware circuits. However, it is possible to realize a part of the functions of the reception unit 10 by means of software.

The error detection unit 11 determines whether or not a received packet includes an erroneous element (in other words, whether or not the received packet is an error packet). The error packets include, for example, a packet whose header or data has been damaged, invalid or inadequate packet, or the like. The error packet is generated in a case of, for example, failure of the system board modules 1, disconnection of a bus between the system board modules 1 and the crossbar module 2, or the like. The error detection unit 11 monitors the errors (1) through (4) described below, and when an error is detected, the error detection unit 11 reports the detection of the error to the system control unit 3 and the transmission control unit 13.

(1) The ECC error is checked. Regarding the ECC error, the header and each data unit is checked. When the error can be corrected by the ECC, it is not always necessary to report that error to the system control unit 3 or the transmission control unit 13.

(2) It is checked whether the destination of the packet is appropriate. Specifically, it is checked, for example, whether or not the system board module that is the transmission source of the packet and the system board module that is the transmission destination of that packet belong to the same partition. When the transmission source system board module and the destination system board module belong to the partitions different from each other, it is determined that a destination error has occurred. The check of the destination error is performed basically on peer-to-peer packets.

(3) The time-out error is checked. Specifically, the error detection unit 11 activates a timer when it detects the header of the received packed. Also, the error detection unit 11 recognizes the cycle number of the data units in the packet by analyzing the header of the received packet. Then, the error detection unit 11 initializes the timer each time the error detection unit 11 receives a data unit, and when the subsequent data unit can not be received within a prescribed time period, the error detection unit 11 determines that a time-out error is occurred.

(4) When the format of the received packet is not legitimate, or when the received packet contains data that would not be received in a normal transmission, it is determined that an illegal command error has occurred. Examples of the "data that would not be received in a normal transmission" include a case where it is provided in a protocol or the like that a prescribed value should be set in a prescribed region in a packet, but a different value is set in the prescribed region.

The packet completion unit 12 analyzes the header of the received packet, and detects the cycle number of the data units of the packet. The detected cycle number is set in a cycle counter as shown in FIG. 3. In this example, "8" is set in the cycle counter. A value in the cycle counter is decremented by one each time a subsequent data unit is received. When the error detection unit 11 detects an error, the packet completion unit 12 receives a completion data generation request from the transmission control unit 13. The packet completion unit 12 reads the counter value in the cycle counter at the timing when this request is received, and generates as many completion data units as the read counter value. In this example, when an error is detected in data unit D4, the counter value of the cycle counter is "4". Accordingly, four completion data units P1 through P4 are generated. When the cycle counter has been decremented to zero, a completion data unit is not generated.

The data length of the completion data unit is the same as that of the data unit contained in a packet sent out from the system board module 1. In this example, it is assumed that the data length of each data unit contained in each packet is constant and that the data length of each completion data unit is also constant. The contents of data sequence in the respective completion data units are not particularly limited, however, an example thereof is a data pattern that is predetermined to indicate that the data is completion data. Also, the packet completion unit 12 outputs completion data units and error correcting codes that correspond to the completion data units. It is also possible to employ a configuration in which a pair of a completion data unit and its corresponding error correcting code is held in a holding circuit in advance. In such a case, when a completion data generation request is given, the packet completion unit 12 repeatedly reads the completion data unit and its corresponding error correcting code from the holding circuit and outputs them as many times as necessary.

When an error is detected by the error detection unit 11, the transmission control unit 13 sends the above described completion data generation request to the packet completion unit 12. Also, the transmission control unit 13 includes a selector circuit 14 shown in FIG. 4. In the selector circuit 14, a received packet is input into the first input terminal and the packet completion unit 12 is connected to the second input terminal. A switch SW1 selects the first or second input terminal in accordance with an error detection signal specifying a detection result in the error detection unit 11. In this example, the first input terminal is selected while an error is not detected and received packet data is guided to a switch SW2. When an error is detected, the second input terminal is selected and the completion data generated by the packet completion unit 12 is guided to the switch SW2. Then, the switch SW2 selects an output terminal in accordance with the destination information contained in the header of the received packet. Additionally, when a broadcast packet is received, the switch SW2 guides the packet data to all the system board modules 1 in the same partition in accordance with the type information detected from the header of the packet.

In the example shown in FIG. 3, an error is detected in data unit D4. In this case, before the detection of the error, the selector circuit 14 selects and outputs the received packets. Specifically, the header and the data units D0 through D3 are output. Next, when a report of the detection of the error in data unit D4 is received, the transmission control unit 13 prepares a completion data generation request and sends it to the packet completion unit 12. At this time, the cycle counter in the packet completion unit 12 is "4". Accordingly, the packet completion unit 12 generates four completion data units P1 through P4, and transmits them to the transmission control unit 13. Then, the selector circuit 14 controls the switch SW1 and to select and output completion data units P1 through P4 instead of data units D4 through D8. In other words, the transmission control unit 13 outputs a completion packet including the header, data units D0 through D3, and completion data units P1 through P4. When this step is executed, data units D4 through D8 are discarded and a bus locking operation is performed.

As described above, when detecting an error packet, the error control device according to an embodiment outputs a completion packet in which the data unit involving the erroneous element and its subsequent data units have been replaced with completion data units. In this configuration, the completion data units do not involve an erroneous element. Accordingly, the transmission units 20 connected in a stage later than the reception unit 10 and the destination system board modules 1 can continue the regular or normal operations so that the influence of the error does not extend.

For example, it is assumed that the transmission unit 20 and the destination system board module 1 have a function of checking the time-out error. In addition, it is assumed that the reception unit 10 could receive data units D0 through D3 but could not receive data units D4 through D7 within a prescribed time period after receiving the header of a packet. In other words, the time-out error is detected in the reception unit 10. In this case, in the conventional crossbar module, the reception unit 10 transfers only the header and data units D0 through D3 to the transmission unit 20 and the destination system board module 1. Accordingly, the time-out error occurs also in the transmission unit 20 and the destination system board module 1 that are the destinations. In other words, the influence of the error expands. By contrast, the crossbar module 2 having the error control apparatus according to an embodiment, in the above case, transfers, in addition to the header and data units D0 through D3, completion data units P1 through P4 to the transmission unit 20 and the destination system board module 1. Accordingly, the time-out error does not occur in the transmission unit 20 or the destination system board module 1. Also, completion data units P1 through P4 are added the respectively corresponding error correcting codes, accordingly the ECC error does not occur in the transmission unit 20 or the destination system board module 1. In other words, the expansion of the influence of the error is avoided.

As another example, it is assumed that a destination error is detected in the reception unit 10. In such a case, the error detection unit 11 reports to the selector circuit 14 the occurrence of the destination error by using an error detection signal. Then, the selector circuit 14 immediately locks the switch SW 2. Accordingly, it is avoided that a packet involving erroneous destination information is transferred to the erroneous destination in accordance with that destination information. In other words, it is at least avoided that the influence of an error occurring in one partition propagates to another partition.

When, for example, the system board module (#0) has failed in the configuration shown in FIG. 1, the operations in partition A having the system board module (#0) can not be continued basically. Then, the computer resources (mainly the software resources) in partition A are initialized. However, in the other partitions, the operations can be continued without being influenced by the error that has occurred in partition A. Also, in partition A, it is possible to restart the operation by reactivating only the other system board modules than the system board module (#0) that has failed.

Also, after an error is once detected, the switch SW2 in the selector circuit 14 may halt the output of all the packets or may permit the output of particular types of the packets before the recovering operation is completed. Examples of the particular types of the packets include packets for the maintenance operations, and these packets are identified on the basis of the type information contained in the header.

As described above, it is possible to limit to the minimum scope over which the influence of an error propagates by introducing the error control apparatus according to an embodiment. As a result, the entire system (especially, the operations of the other partitions) does not have to be halted so that the operations are stabilized. Accordingly, highly reliable large scale server systems can be provided.

In above example, a configuration in which packets are transmitted between system board modules is employed. However, the scope of the present invention is not limited to this example. In other words, the present invention can be applied to wide variety of configurations in which data is transmitted between system board modules.

Another Embodiment

When receiving the header of a packet, the transmission control unit 13 can sequentially output, to corresponding transmission unit 20, the received data units without waiting for the last data unit in that packet. By contrast, the transmission control unit 13 in this embodiment has a packet holding unit 15 in order to hold the received packet until the last data unit is received. When no error is detected in all the cycles in the received packet, the transmission control unit 13 outputs that packet to corresponding transmission unit 10. When this configuration is introduced, the efficiency of transmitting packets having the large cycle numbers is reduced. However, unnecessary traffic or unnecessary operations caused by error packets can be avoided. Also, it is possible to surely avoid the propagation of errors.

It is also possible to provide an error reporting function to each of the transmission units 20 in the crossbar module 2. One of the operations performed by the error reporting function is to report detection of an error in the crossbar module 2 to the system board module 1 that has filed. The report of errors can be made by using packets or by using a dedicated line. The system board module 1 having received the error report stops transmitting subsequent packets for example.

According to one aspect of the error control apparatus, an error packet is not transferred to the circuit element in the interconnection device or to the destination information processing module. At this time, the completion packet in which the completion data is provided in place of data including erroneous element is transferred in stead of the error packet. Accordingly, it is possible to minimize the influence of an error upon the circuit elements in the interconnection device and the destination information processing modules.

According to another aspect of the error control apparatus, it is possible to surely prevent an error packet from being transferred to the circuit elements in the interconnection device or to the destination information processing modules.

What is claimed is:

1. An interconnection device for interconnecting a plurality of information processing modules grouped into a plurality of partitions and for transmitting a packet containing a plurality of data units and destination information received from any of the information processing modules to one or more of the information processing modules corresponding to the destination information, the interconnection device comprising:

an error detection unit configured to detect an error in an input packet received from any of the information processing modules;

a completion data generation unit configured to generate completion data corresponding to each of a data unit involving the error detected in the input packet and a subsequent data unit contained in the input packet; and an output unit configured to output a completion packet in which the completion data is provided in place of the data unit involving the detected error and the subsequent data unit in the input packet, wherein when the error detection unit detects a destination error in which a destination of the input packet is an information processing module belonging to a partition which is different from a partition to which the information processing module which has transmitted the input packet belongs, then the output unit does not output a packet to the destination of the input packet, when the error detection unit detects an error which is different from the destination error, the output unit outputs the completion packet, and after an error is detected in a packet sent from any of the plurality of information processing modules, the output unit outputs a packet received from any of the plurality of information processing modules only when this received packet is a maintenance packet.

2. The interconnection device according to claim 1, wherein the input packet includes information representing the number of data units contained in the input packet, and the completion data generation unit counts the number of data units involving the error detected by the error detection unit and subsequent data unit contained in the input packet, and generates as many units of completion data as the counted number.

3. The interconnection device according to claim 1, further comprising a reporting unit configured to report, when an error is detected in a packet sent out from any of the plurality of information processing modules, an occurrence of an error to information processing module which have sent the packet.

4. A method used by an interconnection device for interconnecting a plurality of information processing modules grouped into a plurality of partitions and for transmitting a packet containing a plurality of data units and destination information received from any of the information processing modules to one or more of the information processing modules corresponding to the destination information, the method comprising:

monitoring an error in an input packet received from any of the information processing modules;

detecting an error in the input packet;

generating completion data corresponding to each of a data unit involving the error detected in the input packet and a subsequent data unit contained in the input packet; and outputting a completion packet in which the completion data is provided in place of the data unit involving the detected error and the subsequent data unit in the input packet, wherein when the detecting process detects a destination error in which a destination of the input packet is an information processing module belonging to a partition which is different from a partition to which the information processing module which has transmitted the input packet belongs, then the outputting process does not output a packet to the destination of the input packet, when the detecting process detects an error which is different from the destination error, the outputting process outputs the completion packet, and after an error is detected in a packet sent from any of the plurality of information processing modules, the outputting process outputs a packet received from any of the plurality of information processing modules only when this received packet is a maintenance packet.

5. The interconnection device according to claim 1, further comprising a partition information storage unit configured to store identification information indicating a partition group to which each information processing module belongs, wherein the error detection unit detects a detection error in accordance with the identification information.

\* \* \* \* \*